United States Patent [19]

Chattopadhyay

[11] Patent Number: 5,567,910

[45] Date of Patent: Oct. 22, 1996

[54] COATING FOR AMMONIUM NITRATE PRILLS

[75] Inventor: Arun K. Chattopadhyay, Brossard, Canada

[73] Assignee: ICI Canada Inc., McMasterville, Canada

[21] Appl. No.: 248,643

[22] Filed: May 25, 1994

[51] Int. Cl.⁶ .................................................. C06B 45/18
[52] U.S. Cl. .................................................. 149/3; 149/46
[58] Field of Search .................................. 149/3, 6, 7, 46

[56] References Cited

U.S. PATENT DOCUMENTS

| | | | |
|---|---|---|---|
| 3,779,821 | 12/1973 | Fujiki et al. | 149/7 |
| 3,816,191 | 6/1974 | Wilson et al. | 149/41 |
| 3,834,955 | 9/1974 | Fox et al. | 149/44 |
| 5,041,177 | 8/1991 | Hajto et al. | 149/5 |

*Primary Examiner*—Charles T. Jordan
*Assistant Examiner*—Anthony R. Chi
*Attorney, Agent, or Firm*—Charles Q. Buckwalter

[57] ABSTRACT

The present invention is directed to a coating for ammonium nitrate prills which enhances the storage life and facilitates the transportation of said prills. The coating is derived from stearic acid and is hydrophobic.

16 Claims, No Drawings

COATING FOR AMMONIUM NITRATE PRILLS

The present invention is directed to an improved coating material for use on ammonium nitrate prills. This coating material improves the flowability of the prills and reduces the amount of fines that result from the transportation and/or storage of the prills.

A problem that has plagued the Bulk Explosive Art for some time is the interaction of ammonium nitrate prills with each other or the environment once the prill has been manufactured. Generally, the prill is made in what is known as a prilling tower, bagged or placed in large bins for storage. Eventually the prills are shipped in bulk to there final destination for use, either as explosives or as fertilizer depending upon the density of the prill. The problem is simply that moisture in the air, friction due to normal transportation, and the environmental factors associated with transportation and storage of bulk materials has a dispositive effect on the integrity of the prilled material. This results in an ammonium nitrate prill that becomes less effective as the final product with the production of fines and becomes less handleable due to caking.

Much of the prior art that deals with the coating of ammonium nitrate prills is directed to coating to protect the prill from the invasive effects of solvents often used as a carrier for the prills when loaded in a borehole. In particular, U.S. Pat. Nos. 4,615,751, 4,404,050, and 4,555,278 are directed to different means and process whereby the ammonium nitrate prill is protected for some shelf life time period from the admixed solvents.

Attempts have beer made to extend the storage life of prills with the addition of a coating for dry storage. U.S. Pat. No. 3,834,955 discloses coating ammonium nitrate with a hydrophobic coating comprised of fatty acids, aluminum, talc, and zinc stearate. Japanese patent 49,047,300 discloses the use of salts of metals, except magnesium, in combination with stearate and prill. U.S. Pat. No. 4,220,463 discloses the use of alkylamines and mineral oil with ammonium nitrate prills.

Some of the explosives coatings in the following references are directed to coating for transportation and storage purposes.

The present invention differs from that art in that the primary interest is in protecting the ammonium nitrate prill during the fragile stage of "dry" storage and transportation without affecting and in some cases improving its performance characteristics in the field. The invention is found useful for coating dense and porous ammonium nitrate prills for use in explosives and fertilizers.

SUMMARY OF THE INVENTION

A coating for ammonium nitrate prills comprised of metal ions selected from the group consisting of the alkalis, alkaline earths, aluminum, zinc or some combination thereof, combined with stearic acid in stoichiometric ratios to make a stearate salt wherein said salt is in combination with a dispersing agent comprised of fatty amides wherein said salt present from 1 to 80 weight percent of said coating. Preferably the stearate salt is present from 20 to 60 weight percent. Most preferably the stearate salt is present from 30 to 40 weight percent. The alkali metal ions are preferably selected from sodium and potassium, most preferably sodium. The alkaline earth metal ions are preferably magnesium and calcium and most preferably magnesium.

Examples of fatty amides compatible with this coating are comprised of branched, saturated and/or unsaturated linear hydrocarbons of carbon number ranging between C12 to C30. The most preferred fatty amides are the disteramides.

The metal ions associate with the stearic acid to form the stearate salt, generally, one metal ion to each stearate. The stearate then combines with the dispersant, the fatty amides, to form an admixture which is homogeneously dispersed as a coating.

The ammonium nitrate prill may be formed so that the density of the prill has both open and closed porosity. The porosity of the ammonium nitrate affects performance of the end product use whether the use is to be as a fertilizer or as an explosive. Generally, more porous ammonium nitrate prills are used as explosives. For the purpose of the present invention, whether open or closed porosity is present has little effect upon the coatability of the inventive coating.

For example, open porosity means that pores extend into the interstices of the prill. This additional porosity has no effect on the coating since the coating does not need to close the open porosity for the coating to be effective for the purposes of transportation and storage. The coating is hydrophobic and produces a pronounced hydrophobic effect upon the ammonium nitrate prill. As a result, it has been observed that water does not easily penetrate the coating even though the open porosity remains uncoated. It is believed that because of this effect, fewer fines are created since there is less interaction between ambient water vapor and the prill.

As an additional benefit, the coating offers itself as a lubricant to the normal frictional forces observed in batches of prills. The lubricating aspect of the coating also aids in the reduction of fines since there is a correlation between increased fines and increased abrasion.

This lubricating property also provides assistance in the anticaking result which is observed when the prills have been coated and stored. Often, without the inventive coating, stored prills slowly become a single mass or transformed into a powdered mass. As a consequence, the prill loses its particle identity and becomes difficult to handle and less acceptable for its use in such final form. The present inventive coating maintains the integrity of the particle identity. This is important since the shelf life, transportability, and usability are all enhanced.

Interestingly, the use of the stearate provides additional oxygen to the prill for use as an explosive. In the use of ammonium nitrate prills for explosives, the prills are often mixed with a fuel oil, making ANFO, to add fuel and oxidizer to enhance the explosive character of the prill. The present invention easily lends itself to use in ANFO as a fuel with higher oxygen content. This can be advantageous dependent upon the needs of the explosive design.

Yet another advantage of this coating is its apparent chemical inertness to ammonium nitrate. Coatings often must bind with their substrates in order to coat effectively. In this instance, although the mechanism is not entirely clear, the coating coats without any substantial physico-chemical interaction. Since there is no substantial physico-chemical interaction the integrity of the prill surface is left in tact. It is believed that the dominant interplay forces are physical and due to forces related to surface energies.

Yet another advantage of this coating is its compatibility with explosive emulsion formulations. In general, an additional chemical agent often has the potential to cause a breakdown in the interaction of the various emulsion components in a formulation. Emulsion formulations are the outgrowth of volumes of experimentations wherein the final formulation becomes sensitive to the inclusion of additional chemical species. The AN prills coated with the inventive coating after being blended with emulsions exhibited similar properties to those of the blends based on uncoated prills. Therefore, it has been concluded to date that the inventive coating enhances the dry portion of the storage and handling of prills and does not interfere with the business end of the ammonium nitrate, explosions.

A preferred embodiment of the present invention is to dilute the coating with a diluent such as oils and waxes from about 10 to 80 percent by weight, most preferably 30 to 50 weight percent. Oils found useful as a diluent are glycerides, paraffinic oil, mineral oils and combinations thereof. Waxes found useful are paraffinic waxes, beeswax, slackwax, and combinations thereof. In its most preferred embodiment the oil of choice is paraffinic oil and the wax of preference is slackwax.

In the application of the coating to the prill, it may be applied by any method known by those skilled in this art for coating prills with a liquid coating. Generally, the coating is a liquid above 75 degrees centigrade and condenses to a solid below 65 degrees centigrade. The most preferred method of coating the present invention is to spray coat the prills on line after prill formation. The spray coat is applied in a coating drum. The coating drum has a controlled environment wherein the temperature and rate of feed of the prills is controlled. Coating integrity is assured by the reduction of temperature from a spray temperature of approximately 80 degrees centigrade which is subsequently reduced to about prill temperature or about 30 degrees centigrade. The prill is subsequently stored to be shipped to its final destination.

DESCRIPTION OF THE EMBODIMENTS

The following description is given to further illustrate the advantages provided by the present invention and are not intended to limit the scope of the invention. Generally, the prills for the following examples were manufactured by the same process. Any coating applied was applied to similarly made ammonium nitrate prills.

The coating of the present invention was made as follows. 5 parts of stearic acid (obtained from AKZO Chemicals) is reacted with 4.5 parts of octadecyl amine (obtained from AKZO Chemicals) at 120 degrees centigrade. The reaction was continued until the formation of the stearamide was completed. 4 parts of magnesium stearate (obtained from Witco Chemical Company, Toronto Canada) was mixed with 9 parts of paraffin oil as a slurry and slowly added to the hot amide solution in a stirred vessel. The admixtures slowly disperse into the amide making a clear solution. Then this clear solution is sprayed onto the prills by means of a spray nozzle connected with a metering pump in order to deliver the coating of a desired quantity.

Five comparative examples were made by a similar kind of process. The coatings of the comparative examples were as follows: Comparative Example 1 coating was Lilamine 81L (obtained from Berol Nobel, Sweden), Comparative Example 2 was Lilamine 88L (obtained from Berol Nobel), Comparative Example 3 was Galoryl ATH626 (obtained from Lobeko, U.S.), Comparative Example 4 was Carseland Regular with a coating of PetroAG/Talc in 0.05/0.35 weight percent (obtained from Lobeko, U.S.) and Comparative Example 5 was an uncoated prill.

The five comparative examples and the inventive example were subjected to a caking test to determine the effect of the inventive coating. 135 grams of prill of each example was poured into the mold. The mold was gently vibrated to allow the prills to settle to provide a uniform distribution of pressure throughout the sample. The height of the sample was measured and entered into the program parameters of the computer program which calculates the force required to break the caked prills. The mold was placed between the compression plates an Instron press and the prills compressed at a stress rate of 1 mm/min until the compression force of 4500N was reached. The sample was left under compression for a period of 10 minutes. The height of the caked sample was recorded. The program was preset to break the cake formed due to compression. The force required to break the cake was determined by computer analysis. The higher the force, the stronger the cake. The percent moisture was measured by Karl-Fisher titration technique, known by those skilled in this art. Table 1 shows the results of these tests.

TABLE 1

| Example | % coating Added by Weight | % Moisture | Breaking Strength |
|---|---|---|---|
| 1 | 0.10 | 0.12 | 2918 |
| 2 | 0.08 | 0.11 | 3287 |
| 3 | 0.10 | 0.12 | 1986 |
| 4 | 0.05/.35 | 0.12 | 2787 |
| 5 | 0 | 0.12 | 4600 |
| inventive coating | 0.06 | 0.10 | 1325 |

The smaller the breaking strength the less caking occurred for the purposes of the caking test which has been interpreted to mean that less caking will occur during storage. It is noted that the inventive coating produced a 50% improvement over the closest comparative example, Comparative Example 2. An additional inventive example was subjected to the caking test and found to have a breaking strength of 1024N. This inventive example had a polysulfonate additive, in this case sodium polystyrene sulfonate combined with the prill first, then the inventive coating added. The polysulfonate additive is described in U.S. patent application, Ser. No. 07/878,720, filed May 4, 1992 herein incorporated by reference as filed.

Samples of the same examples in Table 1 were subjected to a temperature cycling test to determine the amount of fines which would be produced through hot and cold cyclic storage tests. The coated prills were combined with 6% oil to form ANFO. The samples were cycled through a temperature range of 35 to minus 35 degrees centigrade, being held at ambient temperature ("AMB"), 20 degrees centigrade, for some periods. A measure of the integrity of the prills after such environmental tests is the amount of fines measured. Fines are defined as the particulate produced during storage with an average diameter of less than 1.18 mm. Table II gives the results, in grams, of fines recovered from each example. More fines recovered indicates less shelf life.

TABLE II

| Example | AMB | 35 C. | −35 C. | 35 C./ AMB | −35 C./ AMB | −35 C./ 35 C. |
|---|---|---|---|---|---|---|
| 1 | 0.5 | 3.2 | 42.5 | 3.2 | 71.0 | 86.9 |
| 2 | 0.8 | 2.9 | 40.9 | 3.5 | 71.0 | 82.3 |
| 3 | 0.5 | 0.5 | 28 | 0.8 | 64.3 | 80.4 |
| 5 | 0.5 | 2.2 | 24.7 | 1.8 | 31.0 | 58.0 |
| inventive coating | 0.5 | 0.5 | 13.7 | 0.5 | 48.6 | 67.0 |

It is noted that of the coated samples, the inventive sample was the least invasive and at certain conditions showed much better results than all examples.

I claim:

1. A coating for ammonium nitrate prills comprised of metal ions selected from the group consisting of alkalis, alkaline earths, aluminum, zinc or some combination thereof, combined with stearic acid in stoichiometric ratios to make a stearic salt wherein said salt is in combination with a dispersing agent consisting of steramide, disteramide, and a combination thereof wherein said salt comprises from about 1 to 80 weight percent of said coating.

2. The coating in claim 1 wherein said metal ion consists of magnesium.

3. The coating of claim 1 wherein said stearate salt comprises from about 20 to 60 percent of said coating.

4. The coating of claim 1 wherein said stearate salt comprises from about 30 to 40 percent of said coating.

5. The coating of claim 1 wherein said fatty amide is disteramide.

6. The coating of claim 1 wherein said prill is combined with sodium polystyrene sulfonate and said coating.

7. The coating of claim 1 wherein said stearate salt and fatty amide combination is homogeneously dispersed.

8. The coating on ammonium nitrate prills of claim 1 wherein said prills are in combination with a fuel oil to make an explosive.

9. The coating of claim 1 wherein said coating is hydrophobic.

10. The coating of claim 1 wherein said coating is combined with a diluent from about 10 to 80 weight percent.

11. The coating of claim 1 wherein said coating is combined with a diluent from about 30 to 50 weight percent.

12. The coating of claim 10 wherein said diluent is an oil.

13. The coating of claim 10 wherein said diluent is a wax.

14. The coating of claim 12 wherein said oil is selected from the group consisting of glycerides, paraffinic oil, mineral oils or some combination thereof.

15. The coating of claim 13 wherein said wax is selected from the group consisting of paraffinic wax, beeswax, slackwax or some combination thereof.

16. The coating of claim 1 wherein said coating is compatible with emulsion formulations.

* * * * *